Figure 1:
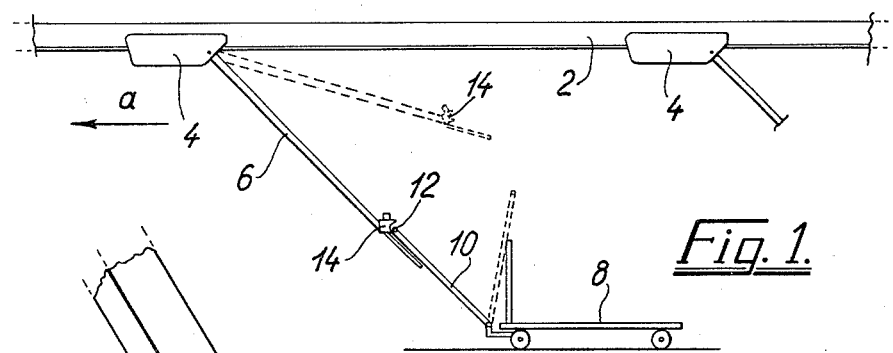

United States Patent [19]

Nielsen

[11] 4,220,094

[45] Sep. 2, 1980

[54] CONVEYOR SYSTEMS

[75] Inventor: Jacob A. Nielsen, Viby, Denmark

[73] Assignee: Kosan Crisplant A/S, Denmark

[21] Appl. No.: 895,434

[22] Filed: Apr. 11, 1978

[30] Foreign Application Priority Data

Apr. 12, 1977 [GB] United Kingdom ............... 15061/77

[51] Int. Cl.² ............................................. B61B 3/00
[52] U.S. Cl. ...................................... 104/89; 403/330;
24/230 A; 403/393; 24/230 AP; 104/170
[58] Field of Search .................. 104/89, 170, 88, 193,
104/173; 403/95, 100, 102, 330, 393, 373, 78,
66; 24/230 AP, 230 A; 213/75, 80, 82, 175;
294/83 R; 244/135 A, 1 TD

[56] References Cited

U.S. PATENT DOCUMENTS

| 519,561 | 5/1894 | Berg | 104/173 |
|---|---|---|---|
| 1,412,181 | 4/1922 | Hyde | 403/330 |
| 1,551,332 | 8/1925 | Schramm | 403/78 |
| 2,660,271 | 11/1953 | Hupp | 403/393 |
| 3,145,042 | 8/1964 | Bendl | 24/230 AP |
| 3,187,347 | 6/1965 | Terron | 403/102 |
| 3,828,681 | 8/1974 | Christensen et al. | 104/170 |

Primary Examiner—Lawrence J. Oresky
Assistant Examiner—Lawrence E. Williams
Attorney, Agent, or Firm—Craig & Antonelli

[57] ABSTRACT

A conveyor system including an overhead conveyor rail system for a plurality of traction members each having a depending tie rod provided at its lower end with a snap coupling for releasably receiving the outer end of a handle rod of any of a plurality of wheel supported carts belonging to the system, for moving the carts on the floor along a predetermined path. The snap coupling an elongate extension member on the tie rod having adjacent its top end a snap latch arrangement for receiving an outermost transverse standard handle bar on the handle rod, and the lower end of the extension member having a transverse portion for abuttingly engaging the adjacent portion of the handle rod itself, when the handle bar is received in the snap lock arrangement, such that by stoppage of the traction member the cart is prevented from moving further by its inertia, without the handle rod having to be of any special design for being usable in the system.

11 Claims, 3 Drawing Figures

U.S. Patent

Sep. 2, 1980

4,220,094

CONVEYOR SYSTEMS

This invention relates to a conveyor system of the type comprising a number of wheel supported conveyor carts each having a pulling and steering rod and an overhead traction system for the carts with the traction system including rail means and traction members moving along the rail means and each provided with a depending tie rod having at its lower end a coupling for releasably engaging a coupling counterpart at the outer or upper end of the pulling and steering rod of any respective conveyor cart. Conveyor systems of this type are used e.g. in freight terminals, where carts loaded in a loading station can be moved to various destinations along the overhead rail system and be disconnected from their respective traction members, which may then continue their movement and thus be usable for bringing emptied carts back to the loading station and then into renewed circulation. The traction members may be either self propelled, individual units or traction blocks on a chain conveyor, and the tie rods connected therewith are normally hinged so as to be vertically tiltable, such that in operation they project downwardly and rearwardly, while when they are disengaged from the pulling and steering rod of a cart, in the following referred to as the handle rod, they assume a raised, rearwardly projecting position. For steering the carts through horizontal curves the tie rods are even horizontally swingably connected with the traction members, and the said handle rods in their turn are also both vertically and horizontally swingably connected with the respective carts.

The coupling means between the free ends of the tie rods and the handle rods should be so adapted that they are easy to connect and disconnect even during motion of the tie rods, and in a simple system the coupling means may be constituted by hook members on the tie rods cooperating with transverse handle bars on the handle rods.

However, in case of a sudden stoppage of a traction member an associated cart will tend to continue its movement by way of its inertia, and especially due to the vertical tiltability of both the tie rod and the handle rod this may result in the cart moving further in an uncontrolled manner. The coupling means, therefore, should preferably be designed so as to interconnect the rod ends in a stiff or non-breakable manner as seen in the vertical plane, while in the horizontal plane the rod ends should still be mutually swingable in order to allow for steering of the carts through curves of the conveyor path. The horizontal swingability, however, may be mechanically restricted such that it is sufficient for the steering purpose, but insufficient for allowing the cart to run past the traction member in said stoppage situation.

A coupling connection meeting the above-noted requirements as to stiffness in the vertical plane and a limited swingability in the horizontal plane is easily provided as an arrangement comprising a vertical pivot pin insertable through aligned vertical pivot bushing portions on the respective free rod ends, these bushing portions being mounted so as to be vertical when the respective rods assume their interengaged positions. However, such a coupling arrangement is generally difficult to handle, because the coupling bushings should be carefully aligned before the coupling pin is inserted, and besides all of the coupling parts should be designed so as to be able to resist the breaking effect as may occur in the vertical plane by stoppage of a traction member, i.e. apart from the coupling pin being heavy, the coupling bushings shall also be heavy and be connected very rigidly to the respective ends of the tie rods and the handle rods. According to another known proposal the opposed coupling parts comprise horizontal disc members on the respective rod ends, these disc members being rotatably frictionally interengageable by way of a snap lock arrangement; hereby the breaking forces will act in a less concentrated coupling area, but still the discs are difficult to align in motion, and the coupling parts should be adapted to each other in a rather accurate manner and secured firmly to both the tie rods and the handle rods.

It is the purpose of the invention to provide a conveyor system of the type referred to in which the coupling means may be of simple and convenient design.

According to the invention the coupling arrangement is designed so as to couple together the respective rod ends in a generally overlapping manner, interacting coupling means being located adjacent the end of one of said rods and spaced from the end of the other rod, while respective rod portions adjacent the end of the other rod and spaced from the end of the first rod, respectively, are arranged to abut each other so as to limit a relative rotation of the two rods about said coupling means. In this manner an outermost length portion of the respective rods will be actively used as elements of the coupling arrangement, and it will be sufficient at one end of the overlapping rod lengths to provide for a simple coupling together of the rods, even by way of coupling means allowing for a relative rotation of the rods, both vertically and horizontally, while at the other end of the overlapping area abutment means may be provided which allow for said horizontal rotation, but prevent the rotation in the vertical plane.

In a preferred embodiment of the invention the tie rod is provided with a snap lock arrangement for receiving an outer transverse handle bar portion of the handle rod, and a lower tie rod portion underneath said snap lock constitutes a guide member for guiding the handle bar into engagement with the snap lock while the lower end of the lower tie rod portion constitutes said abutment for engaging the portion of the handle rod, whereby the important advantage is obtained that the handle rod need not in any way be specifically adapted for use in a system according to the invention, when it is as a standard provided with the outermost transverse handle bar.

The limited horizontal swingability of the intercoupled rods is obtainable by way of a horizontal slip in said snap lock arrangement, but it is preferred to make the lowermost tie rod portion be permanently connected with the upper portion of the tie rod through a horizontally swingable connector means, whereby the snap lock arrangement may hold the handle bar without substantial slip and the abutment portions may engage each other without substantial horizontal sliding therebetween.

In the preferred embodiment the lower tie rod end, by acting as a guide for bringing the handle bar into engagement with the snap lock arrangement, will largely facilitate the operation of coupling the rods together while the tie rod is being moved, because it is sufficient to make the handle rod catch up with the lower tie rod end with the handle bar located within the level range of the said lower tie rod portion, i.e. the parts need not be carefully aligned for effecting their coupling together.

Figure 2:
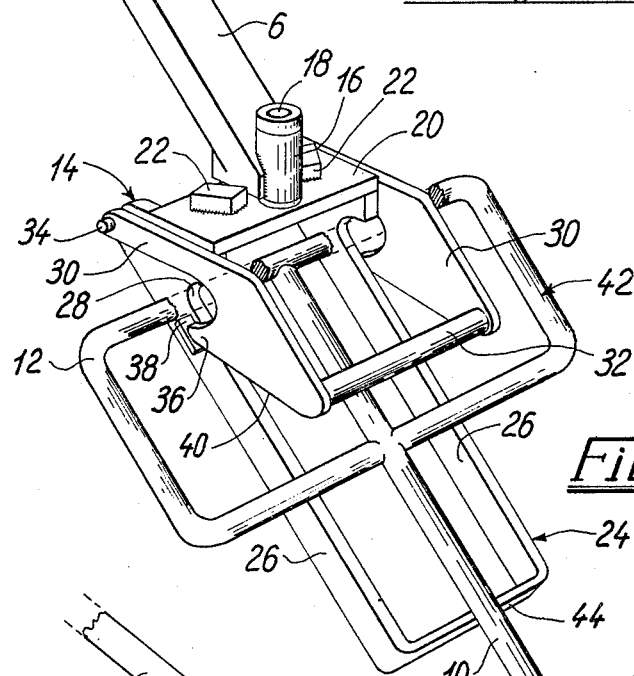
Figure 3:
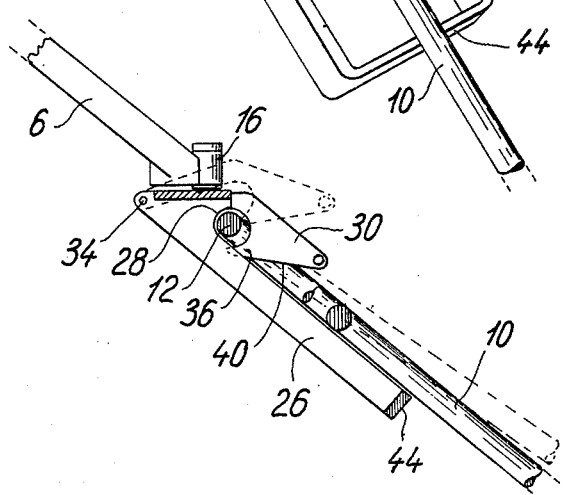

Further details and advantages of the invention will appear from the following description, reference being made to the accompanying drawing, in which:

FIG. 1 is a schematic side view of a section of a conveyor system including a coupling according to the invention, FIG. 2 is a perspective view, partly in section of the coupling shown in FIG. 1, and FIG. 3 is a side view of FIG. 2.

In FIG. 1 is shown an overhead rail structure 2 along which a a motorized traction member 4 is travelling in the direction shown by the arrow a. The traction member 4 has a rearwardly depending tie rod 6, the lower end of which is connected to an outer transverse handle bar 12 of a steering and pulling rod 10 of a wheel cart 8 by means of a coupling system 14 to be described below. The tie rod 6 is tiltable between a lower pulling position and a raised idling position in which it is lifted off the path way underneath the rail structure 2. The tie rod is swingable even in the horizontal plane, and also the coupling system 14 has a certain horizontal flexibility, whereby the cart can be steered smoothly through curves. The raised tie rod 6 can be swung down manually for being releasably connected to a cart 8 as will be described below.

As shown in more detail in FIGS. 2 and 3 the lower end of the tie rod 6 is provided with a journal bearing 16 assuming a vertical position when the tie rod 6 assumes its inclined operative position. A journal 18 axially secured in the bearing 16 projects downwardly through the bearing 16 and is rigidly secured to a plate member 20, which is thus horizontally swingable relative to the tie rod 6. This swingability, however, is limited by opposed stop blocks 22 secured to the plate member 20 and acting as abutments for a portion of the lower end of the rod 6.

To the plate member 20 is rigidly secured a U-shaped member generally designated by the reference numeral 24 forming a lower extension of the rod 6 and comprising two parallel side portions 26 each having a smooth top surface which continues in a half circular recess 28 at the top of each side portion 26. To the top portion of each side portion 26 is at 34 vertically pivotally secured a latch member 30, and the outer free ends of these two latches are interconnected by means of a handle rod 32. Each latch member 30 has a downwardly and forwardly projecting nose portion 36 cooperating with the respective recess 28 to form a holding opening for the handle bar 12. In their swung down positions the nose portions 36 may be supported by abutment members 38 on the side portions 26 of the U-shaped member 24. The lower edges of the nose portions 36, as shown at 40, project rearwardly inclined so as to form an acute angle with the top side of the side members 26.

All the traction units 4 of the conveyor system are provided with tie rods 6 and coupling system 14 as here described, and the carts 8 used in the system are provided with handle rods 10 having outermost handle bars 12, e.g. forming part of a fully conventional handle arrangement generally designated by the reference numeral 42 as shown in FIG. 2.

For coupling together a tie rod 6 with a handle rod 10 it is sufficient to move the outer end of the handle rod 10 horizontally against the extension member 24 of the the rod 6, whereby the handle bar 12 slides under the latch edges 40 and causes the latches 30 to be lifted until the handle bar 12 passes into the recesses 28, beyond the nose portions 36, and the latches 30 will thus fall down again and cause the handle bar 12 to be arrested between the recesses 28 and the latch noses 36. It is unimportant whether the handle bar 12 is arrested with some slip between the recesses 28 and the latch noses 36, since what matters now is that the tie rod 6 is able to pull the cart 8 along by way of the engagement between the nose portions 36 and the handle bar 12. In normal operation the cart 8 may be pulled through horizontal curves, whereby the tie rods 6 and handle rods 10 may be mutually swung horizontally about the journal 18, the stop members 22 being arranged so as to allow for such normal, operational swingability between the tie and handle rods 6, 10.

In order to disengage the coupling coupling system 14 it is of course sufficient to lift the latches 30 by means of the latch handle bar 32, whereafter the handle bar 12 is immediately freed from the coupling system 14.

If during the operation the traction member 4 should suddenly be brought to stop, the cart 8 will seek to continue its motion, but hereby the handle rod 10 will run against bottom portion 44 of the extension member 24 of the tie rod 6 whereby the handle rod 10 is sought to be swung upwardly. This, however, is counteracted by the abutting engagement between the handle rod 10 and the bottom portion 44 of the extension member 24 at one end of the coupling area and by the locking engagement between the handle bar 12 and the latches 30 at the other end of the coupling area, so continued movement of the cart 8 will be possible only by a horizontal displacement of the coupling area, which, however, is soon stopped by means of one of the abutment blocks 22. A sudden stoppage of the traction member 4, therefore, will result in the associated cart 8 being stopped as well, and it will be appreciated that the stoppage of the cart 8 is effected without any part of the handle rod 10 being subjected to excessive breaking forces. It will also be appreciated that the carts 8 may be provided with fully conventional handle arrangement 42 to cooperate with the coupling system 14.

The desired horizontal swingability between the rods 6 and 10 may be achieved by virtue of the free gap between the recesses 28 and the nose portions 36, whereby the U-shaped member 24 could be rigidly connected to the rod 6. However, the swingable mounting of the U-shaped member 24 about the journal 18 is preferred for avoiding wear on the parts, including the engagement area between the rod 10 and the bottom piece 44 of the U-shaped member 24.

For the invention it is important that the desired vertical running-on rigidity of the coupling is achieved by means of opposed coupling and abutment areas located with good spacing from each other, viz. at the top and the bottom of the member 24, and the entire coupling arrangement is simplified in that one of these abutment areas, at 44, should not necessarily be a coupling area, too.

It would be within the scope of the invention to modify the arrangement shown by other combinations of the locations of the coupling and abutment parts at the respective opposite ends of the overlapping rod area and in connection with one or both of the rods. Thus the coupling arrangement may be a running-on coupling whereby the lower end of the tie rod 6 is adapted to catch the upper end of the handle rod 10, when this is held in a ready position in front of the moving tie rod 6, whereby the rod positions will be inverted compared with the arrangement shown in the drawing, and of course the coupling and abutment parts should be rearranged correspondingly, now e.g. using the lower handle bar of the handle arrangement 42 as a coupling member to be received in a snap lock arrangement at the lower end of the member 24.

Of course, the latches 30 may be substituted by any other suitable snap lock arrangement.

What is claimed is:

1. A conveyor system comprising a a plurality of wheel supported conveyor carts each having a pulling and steering rod, an overhead traction system for moving said conveyor carts, said traction system including rail means and traction members moving along said rail means, each of said traction members being provided with a depending tie rod, and a coupling means for releasably coupling an outer or upper end of the pulling and steering rod of any respective conveyor cart to an end of the tie rod, characterized in that the coupling means are constructed as interacting coupling means adapted to couple generally overlapping lengths of the tie rod and pulling rod together, the interacting coupling means being located adjacent the ends of the tie rod and pulling rod, means are provided on one of the tie rod and pulling rod for enabling limited relative rotation between the rods about the coupling means, that abutment means are provided on one of the tie rod and pulling rod for limiting the relative rotation of the two rods about said coupling means and in that said abutment means and said coupling means are disposed adjacent opposite ends of the overlapping length of the tie rod and pulling rod.

2. A conveyor system according to claim 1, characterized in that the interacting coupling means include a transverse member provided on one of the tie rod and pulling rod and a snap lock means for catching and holding the transverse member is provided on the other of the tie rod and pulling rod.

3. A conveyor system according to claim 2, characterized in that the transverse member is a handle provided on said pulling rod, and in that the snap lock means are arranged on said tie rod for cooperation with the handle on said pulling rod.

4. A conveyor system according to one of claims 2 or 3, characterized in that a partial length of one of the tie rod and pulling rod located between said coupling means and said abutment means has a smooth surface portion which is operable to guide the interacting coupling means of the tie rod and pulling rod into engagement with each other in response to the ends of the tie rod and pulling rod being brought together generally in a moving direction of the traction members.

5. A conveyor system according to claim 4, characterized in that the tie rod is provided with a lowermost extension member of substantial width, the smooth surface portion is provided on the lowermost extension member, the snap lock means is arranged adjacent an upper end of the extension member, the transverse member is a handle bar of said pulling rod, and in that a lower end portion of said extension member forms an abutment for a portion of said pulling rod.

6. A conveyor system according to claim 5, characterized in that the snap lock means includes a pair of laterally spaced hook members pivotally connected to the upper end of said extension member, the pair of laterally spaced hook members have outermost portions the lower edges of which form an acute angle with a plane extending through the smooth surface portion of the extension member.

7. A conveyor system according to claim 6, characterized in that the means for enabling limited relative rotation include means for rotatably connecting the extension member with a lower end of the tie rod in such a manner that in an operative position of the tie rod the extension member and therewith an engaged pulling rod is pivotable relative to the pulling rod about a substantially vertical axis.

8. A conveyor system according to claim 5, characterized in that the means for enabling limited relative rotation include means for rotatably connecting the extension member with a lower end of the tie rod in such a manner that in an operative position of the tie rod the extension member and therewith an engaged pulling rod is pivotable relative to the pulling rod about a substantially-vertical axis.

9. A conveyor system according to claim 8, characterized in that the extension member has a U-shaped configuration and includes two parallel side portions each of which define the smooth surface portion of the lower extension member.

10. A conveyor system according to claim 9, characterized in that the side portions terminate in recess means at an upper end of the U-shaped member for accommodating the handle of the pulling rod, and in that a pair of laterally-spaced hook members are pivotally connected to the upper end of said extension member, the pair of laterally-spaced hook members include lower edges which terminate in latching nose portions cooperable with the recess means to couple the handle bar to the tie rod.

11. A conveyor system according to claim 10, characterized in that means are provided for releasing the interengaging coupling means.

* * * * *